April 6, 1954 J. C. BACKE 2,674,175
VENTILATING SYSTEM FOR VEHICLES
Filed April 27, 1951 4 Sheets-Sheet 2
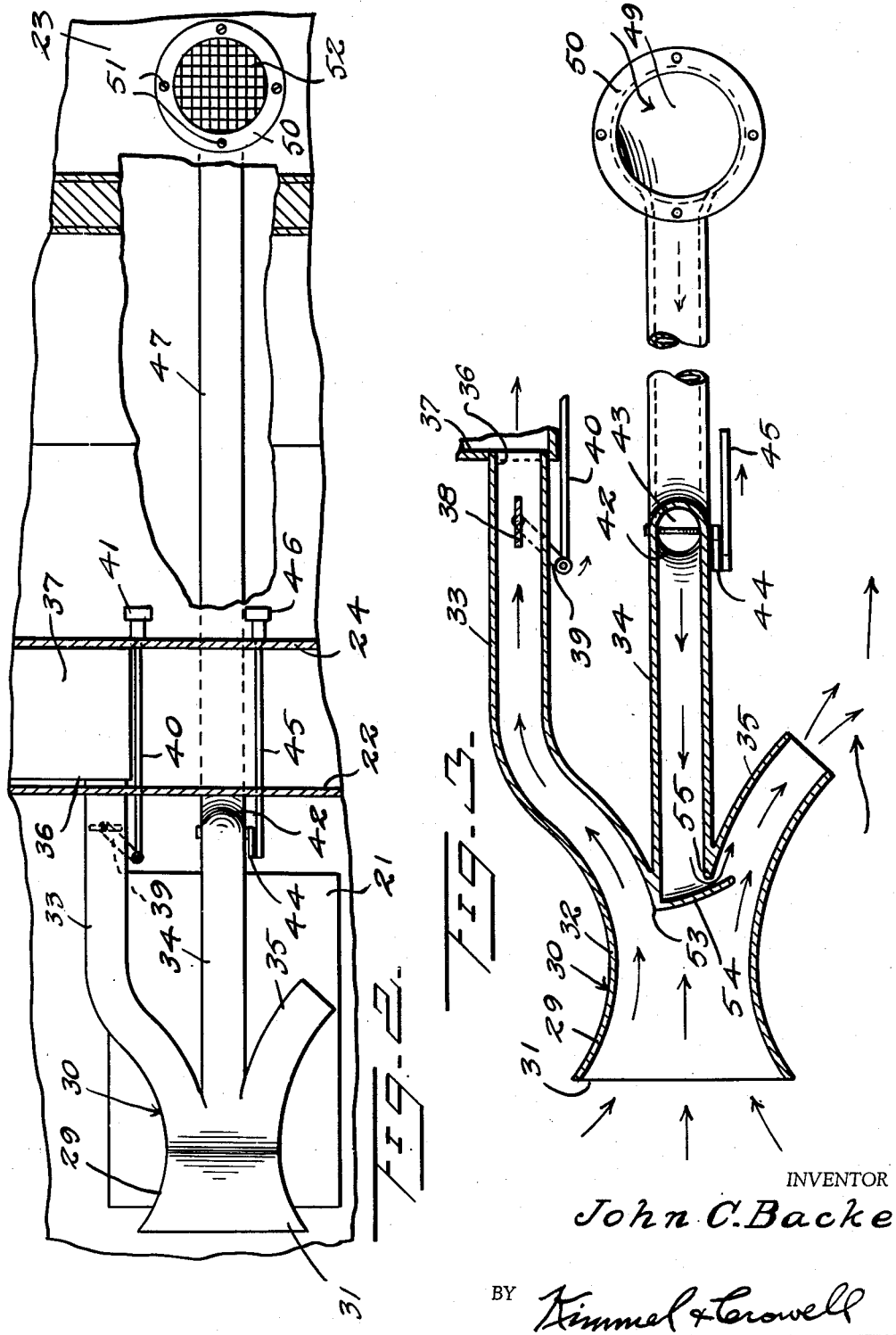
INVENTOR
John C. Backe
BY Kimmel & Crowell
ATTORNEYS

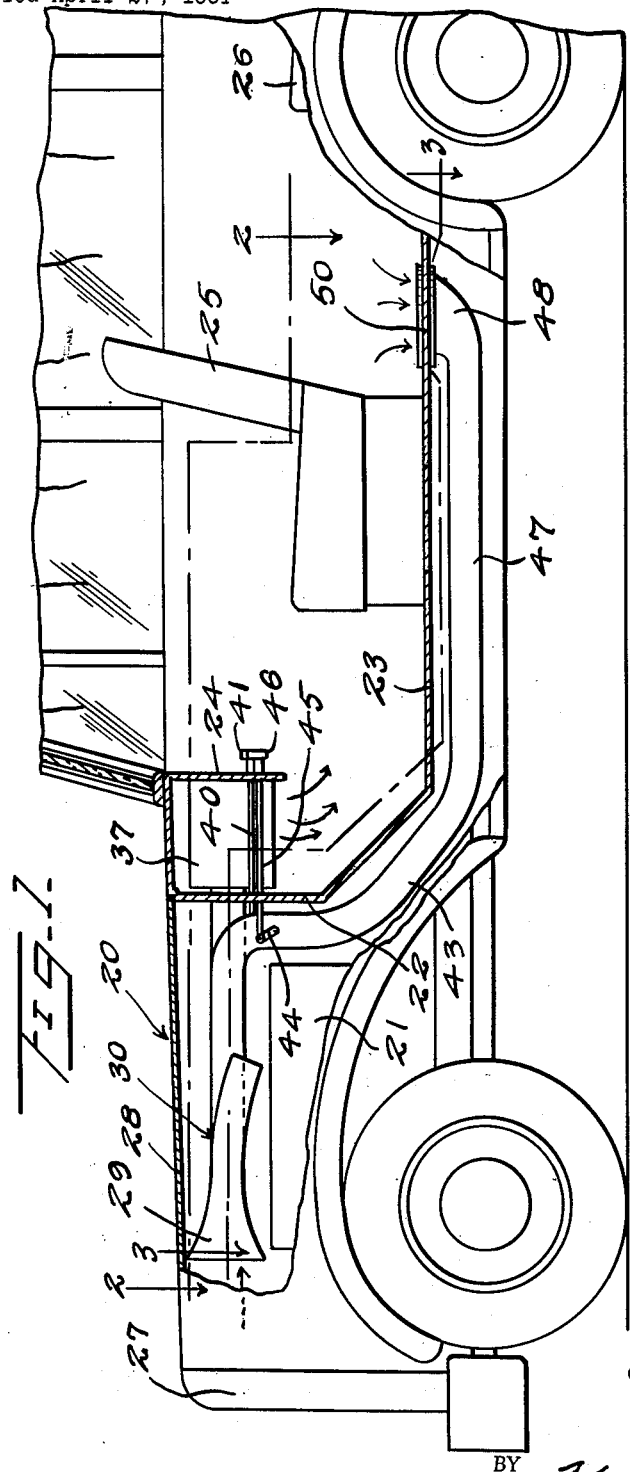

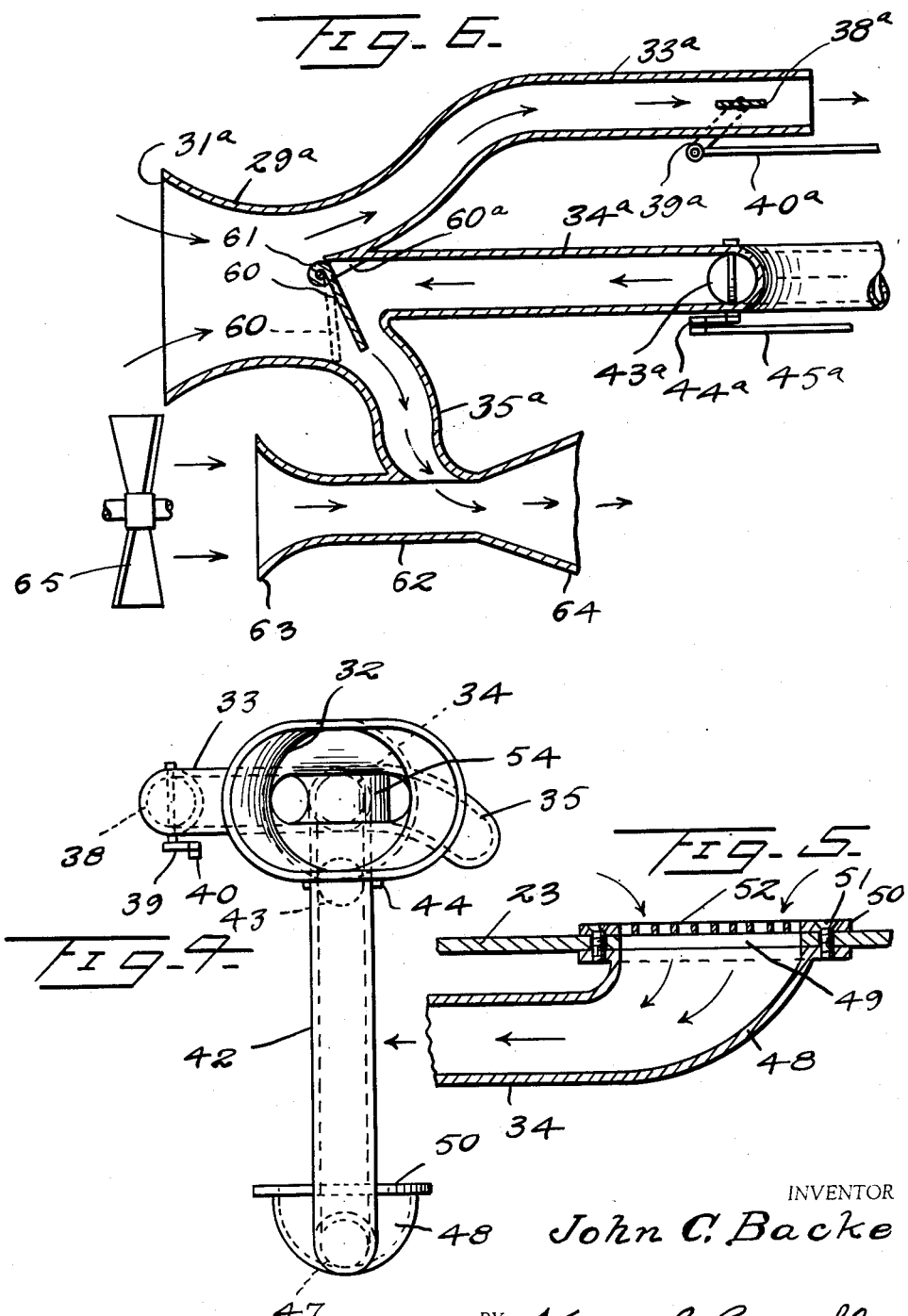

April 6, 1954
J. C. BACKE
2,674,175
VENTILATING SYSTEM FOR VEHICLES
Filed April 27, 1951
4 Sheets-Sheet 4
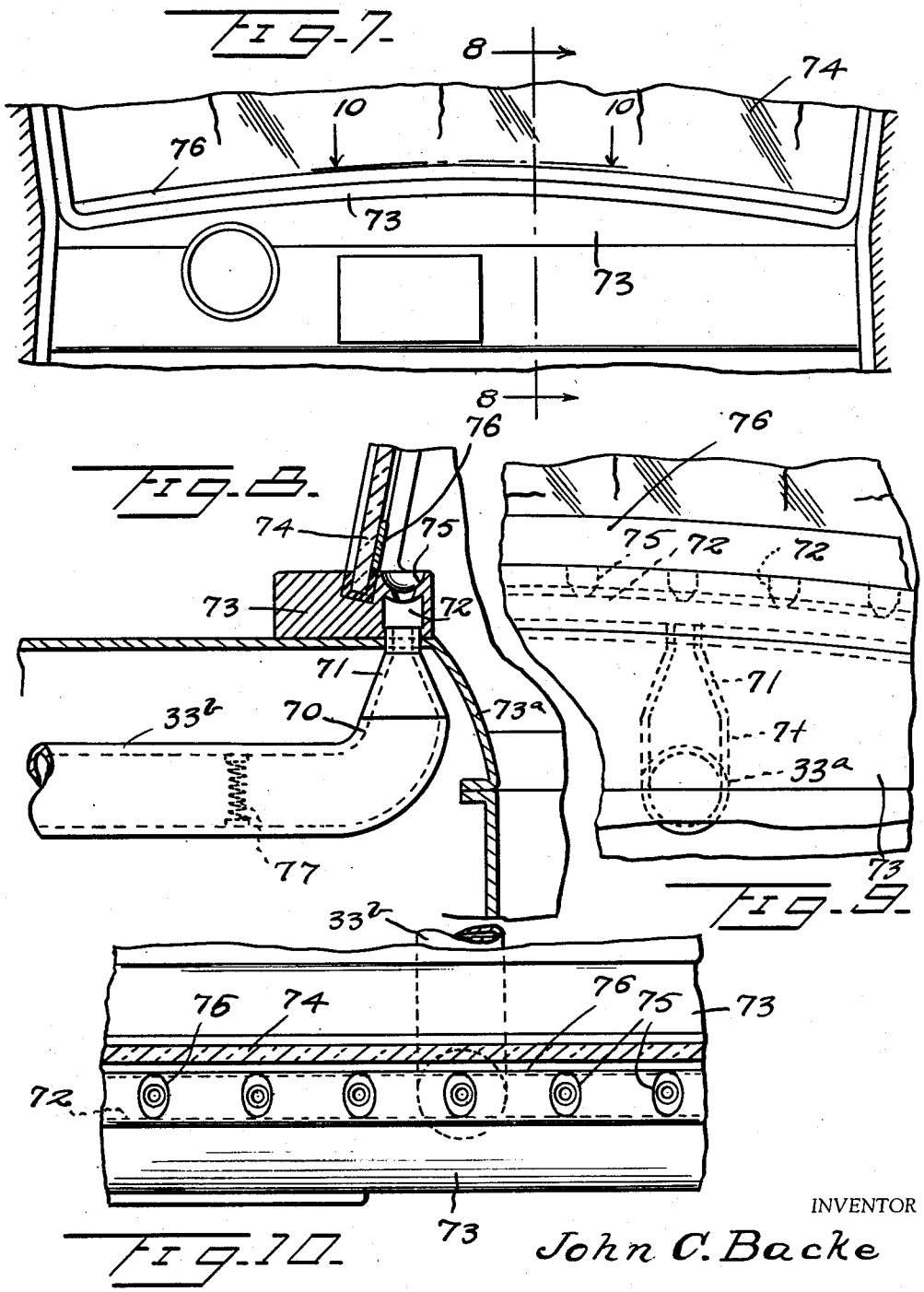
INVENTOR
John C. Backe
BY Kimmel & Crowell
ATTORNEYS Patented Apr. 6, 1954

2,674,175

UNITED STATES PATENT OFFICE 2,674,175

VENTILATING SYSTEM FOR VEHICLES

John C. Backe, Gaylord, Mich.

Application April 27, 1951, Serial No. 223,372

5 Claims. (Cl. 98—2)

This invention relates to a ventilating system for vehicles and more particularly to such a system and apparatus for use in passenger automobiles, although it may be equally advantageously utilized in busses, trucks, aircraft, and the like, and comprises a continuation-in-part of my co-pending application Serial No. 89,525, filed April 25, 1949 now Patent Number 2,604,837 and entitled Ventilation Control Means for Vehicles.

The primary object of the invention is the provision of an improved ventilating system whereby the continuous circulation of heated or cooled air into and out of a closed vehicle is assured.

An additional object of the invention is the provision of such construction wherein the air inlet is positioned adjacent the front end of the vehicle to insure continuous air flow thereinto, and positioned relatively high above the bottom of the vehicle in order to prevent the intake of road dust, exhaust gases, and other undesirable elements.

An additional object of the invention is the provision of such a construction wherein the outlet duct for the used air is positioned in the floor of the vehicle, whereby improved circulation of warm air which tends to rise is provided.

Still another object of the invention is the provision of a duct tending to create a suction to withdraw used air from the vehicle.

A still further object of the invention is the provision of a device of this character provided with means whereby the inlet and outlet ducts may be opened or closed as desired from a location readily accessible to the operator of the vehicle.

Still another object of the invention is the provision of a construction whereby the exhaust venting mechanism may be rendered operative when the motor of the vehicle is in operation, regardless of whether the vehicle is moving or is stationary.

An additional object of the invention is the provision of a construction of this nature whereby warm air may be circulated over the windshield of the vehicle to provide a defrosting medium therefor.

Still other objects reside in the combinations of elements, arrangements of parts, and features of construction, all as will be more fully pointed out hereinafter and disclosed in the accompanying drawings, wherein there are shown preferred embodiments of this inventive concept.

In the drawings:

Fig. 1 is a side view partially in elevation and partially in section disclosing the apparatus of the instant invention as applied to a passenger automobile;

Fig. 2 is a fragmentary enlarged sectional view taken substantially along the line 2—2 of Fig. 1, as viewed in the direction indicated by the arrows;

Fig. 3 is an enlarged sectional view taken substantially along the line 3—3 of Fig. 2, as viewed in the direction indicated by the arrows;

Fig. 4 is a front elevational view of the apparatus of Figs. 1 to 3, inclusive, shown as disassociated from the vehicle, certain concealed portions thereof being indicated in dotted lines;

Fig. 5 is an enlarged sectional view taken substantially along the line 5—5 of Fig. 2, as viewed in the direction indicated by the arrows;

Fig. 6 is a view similar to Fig. 3 showing a modified form of construction;

Fig. 7 is a fragmentary plan view of the interior of a motor vehicle looking toward the windshield, showing a still further modified form of construction;

Fig. 8 is an enlarged sectional view taken substantially along the line 8—8 of Fig. 7, as viewed in the direction indicated by the arrows;

Fig. 9 is an enlarged fragmentary detail view of the structure of Fig. 8, as viewed from the right, certain concealed portions thereof being indicated in dotted lines; and Fig. 10 is a sectional view taken substantially along the line 10—10 of Fig. 7.

Similar reference characters refer to similar parts throughout the several views of the drawings.

Referring now to the drawings in detail, and more particularly to Figs. 1 to 4, inclusive, there is generally indicated at 20 a conventional vehicle body, in this instance a passenger automobile, including a motor 21, a dashboard 22, a floorboard 23, an instrument panel 24, and front and rear seats 25 and 26, respectively.

The vehicle also includes a conventional radiator grille 27 apertured to permit the passage of air through the radiator and over the motor.

Positioned interiorly of hood 28 and over motor 21 is the air scoop 29 of the ventilating apparatus of the instant invention, the latter being generally indicated at 30.

As best shown in Figs. 2 and 3, air scoop 29 includes an outwardly flared mouth 31, providing a Venturi effect, from the throat 32 of which diverge an inlet duct 33, an outlet duct 34 and a suction duct 35. These ducts are substantially coplanar and positioned in a horizontal plane over the motor 21.

Referring first to the inlet duct 33, the same is provided with an outlet 36 extending through the dashboard 22 and opening, in this embodiment of the invention, in the intake of a conventional automobile heater 37. The heater 37 is provided as is conventional with a heating element and a fan or impeller. Inlet duct 33 is provided with a butterfly valve 38 operable by means of a link 39 and control rod 40 through a knob 41 positioned on the dashboard 24 of the vehicle in such position as to be easily accessible to the vehicle operator.

Thus, it will be seen that the quantity of air entering through inlet duct 33 may be readily controlled by means of the valve 38 and either heated by means of the heating element in heater 37 or diffused by means of the fan therein, as may be desired.

With reference to outlet duct 34 the latter is provided with a depending portion 42 within which is positioned a pivotally mounted butterfly valve 43 controlled through a link 44, and a pivotally connected rod 45 by means of a knob 46 also positioned on the dashboard 24 adjacent the knob 41.

From depending portion 42 an outlet duct 47 extends rearwardly under the the floorboard 23 to a position on the floor of the vehicle between front and rear seats 25 and 26 and terminates in an upwardly extending flared portion 48 having an outlet 49 flanged as at 50 and secured to the floorboard 23 by means of suitable screws 51. A suitable grille or lattice work 52 of conventional design is provided to cover the inlet to outlet duct 47.

Adjacent the inner or outlet end of outlet duct 34 and secured to a point 53 at which inlet duct 33 and outlet duct 34 diverge, is a fixed baffle 54 which directs air from outlet duct 34 through a restricted passage 55 into suction passage 35. It will thus be seen that outlet duct 34 may also be controlled from the dashboard by means of the knob 46 and butterfly valve 43 while air entering the air scoop 29 will pass without impedance through the duct 35 creating a suction in the air outlet duct 34 to withdraw used air from the interior of vehicle 20.

Having reference now to the modification disclosed in Fig. 6, there is shown and air scoop 29a flared at its mouth as at 31a and provided with an inlet duct 33a, and outlet duct 34a, and a suction duct 35a, as in the preceding modification. Inlet duct 33a includes a butterfly valve 38a controlled by a link 39a and rod 40a, as in the foregoing modification, while outlet duct 34a includes a butterfly valve 43a controlled by a link 44a and rod 45a. The arrangement of the inlet and outlet ducts and their points of entry into the vehicle are substantially identical to that previously described in connection with the foregoing modification. Instead of the fixed baffle 54, however, the outlet duct 34a is adapted to be selectively closed by means of a baffle 60 pivoted on suitable transversely extending pivot pins 61. The arrangement of the pivoted baffle is such that when the vehicle is in motion the force of air through air scoop 29a will tend to urge the valve to the full line position shown in Fig. 6, whereby air is passed from the air scoop 29a into the exhaust duct 35a, thus withdrawing air from outlet duct 34a in the interior of the vehicle. A suitable stop member 60a is provided to preclude the swinging of valve member 60 to such position as fully to close outlet duct 34a. When the motor of the vehicle is stopped, however, and no air is forced through air scoop 29a, or drawn therethrough, as hereinafter described, valve 60 will swing by gravity to the position indicated by dotted lines in Fig. 6, thus closing the communication between outlet duct 34a and air scoop 29a.

Suction duct 35a opens into a tubular member 62, including a flared inlet 63 and flared outlet 64 to provide a Venturi effect. The inlet 63 is positioned immediately rearwardly of a fan 65, which may either be the conventional cooling fan associated with the engine, or an auxiliary fan, as desired, for the purpose of directing air into the member 62 while the motor is running. With this construction, obviously, air will continue to be withdrawn from the interior of the vehicle, so long as the motor is running, thus providing a continuous heating or cooling effect when the vehicle is stopped, as, for example, by traffic lights or for similar reasons.

Still another modification of the invention is disclosed in Figs. 7 to 10, inclusive. In this form of the invention, the construction of air scoop, inlet duct, outlet duct, and exhaust duct, as embodied in the previous modifications, may be utilized, but the inlet duct 33b instead of terminating rearwardly of a heater, as in the preceding modification, is upwardly curved at its end as at 70 and terminates in a reduced portion 71 in communication with a transversely extending duct or tube 72 which is positioned interiorly of the inner side of the windshield mounting block or head 73 and extends substantially across the full length thereof adjacent the lower edge of the windshield 74. The head or block 73 is suitably positioned above the instrument panel 73a of the vehicle, which may be of any desired conventional configuration, and extend either horizontally or vertically as required. Duct 72 is provided with a plurality of spaced cup-shaped apertures 75, which open upwardly immediately adjacent the lower edge of windshield 74, and direct heated air against a conductive strip 76 which may be comprised of a suitable metallic foil or the like, extending transversely across the lower end of the windshield for its entire width. In this construction, it will be readily apparent that air suitably heated by the motor, or other means, as, for example, a suitable heating element 77 positioned in inlet duct 33b, is directed against the strip 76 to heat the same, which heat is in turn conducted to the glass of the windshield and effectively serves to defrost the same.

By virtue of the shape of apertures 75, additional warm air is directed inwardly and upwardly throughout the vehicle, and withdrawn by means of an outlet duct in communication with the interior of the vehicle through the floorboards thereof as disclosed in the preceding modification, thus insuring substantially even and continuous circulation of air throughout the interior of the vehicle. Obviously, when it is desired to cool the vehicle the heating element 77 may be deenergized, and when such cooling is necessary, since there will obviously be more frosting of the windshield under such conditions, the apertures 75 will serve primarily as outlets for cooling air from the inlet duct 33b.

Now, from the foregoing, it will be seen that there is herein provided an improved ventilating system and apparatus for vehicles, which accomplish all the objects of this invention, and others, including many advantages of great practical utility and commercial importance.

As various embodiments may be made of this inventive concept, and as various modifications

I claim:

1. In a ventilating system for motor vehicles, including a body having a windshield and a mounting therefor, and a hood apertured at its front end, the combination of an air scoop adjacent the top of the apertured end of said hood, an air inlet duct having an opening extending from said hood into said body adjacent said windshield mounting, said duct connecting with an air outlet in the floor of said body, an outlet duct extending from said air outlet to said air scoop, a suction passage diverging from said air scoop adjacent the junction of said outlet duct with said air scoop, and a pivoted baffle in said air scoop directing air from said outlet duct into said suction passage.

2. In a ventilating system for motor vehicles, including a body having a windshield and a mounting therefor, and a hood apertured at its front end, the combination of an air scoop adjacent the top of the apertured end of said hood, an air inlet duct having an opening extending from said hood into said body adjacent said windshield mounting, said duct connecting with an air outlet in the floor of said body, an outlet duct extending from said air outlet to said air scoop, a suction passage diverging from said air scoop adjacent the junction of said outlet duct with said air scoop, a pivoted baffle in said air scoop directing air from said outlet duct into said suction passage, and an air inlet duct for said suction passage spaced from said air scoop.

3. In a ventilating system for motor vehicles including a body having a windshield and a mounting therefor, and a hood apertured at its front end, the combination of an air scoop adjacent the top of the apertured end of said hood, an air inlet duct having an opening extending from said hood into said body adjacent said windshield mounting, said duct connecting with an air outlet in the floor of said body, an outlet duct extending from said air outlet to said air scoop, a suction passage diverging from said air scoop adjacent the junction of said outlet duct with said air scoop, and a freely swingable pivoted baffle in said air scoop directing air from said outlet duct into said suction passage, said valve movable by gravity to close said outlet duct relative to said air scoop when said vehicle is stationary in the absence of air pressure in said air scoop, and an air inlet duct for said suction passage spaced from said air scoop.

4. In a ventilating system for motor vehicles, including a body having a windshield and a mounting therefor, and a hood apertured at its front end, the combination of an air scoop adjacent the top of the apertured end of said hood, an air inlet duct having an opening extending from said hood into said body adjacent said windshield mounting, said duct connecting with an air outlet in the floor of said body, an outlet duct extending from said air outlet to said air scoop, a suction passage diverging from said air scoop adjacent the junction of said outlet duct with said air scoop, a freely swingable pivoted baffle in said air scoop directing air from said outlet duct into said suction passage, said valve movable by gravity to close said outlet duct relative to said air scoop when said vehicle is stationary in the absence of air pressure in said air scoop, stop means limiting the movement of said baffle whereby said outlet duct is open to said suction passage when air pressure is exerted against said baffle through said air scoop, and an air inlet duct for said suction passage spaced from said air scoop.

5. In a ventilating system for motor vehicles, including a body having a windshield and a mounting therefor, and a hood apertured at its front end, the combination of an air scoop adjacent the top of the apertured end of said hood, an air inlet duct having an opening extending from said hood into said body adjacent said windshield mounting, said duct connecting with an air outlet in the floor of said body, an outlet duct extending from said air outlet to said air scoop, a suction passage diverging from said air scoop adjacent the junction of said outlet duct with said air scoop, a freely swingable pivoted baffle in said air scoop directing air from said outlet duct into said suction passage, said valve movable by gravity to close said outlet duct relative to said air scoop when said vehicle is stationary in the absence of air pressure in said air scoop, stop means limiting the movement of said baffle whereby said outlet duct is open to said suction passage when air pressure is exerted against said baffle through said air scoop, an air inlet duct for said suction passage spaced from said air scoop, and fan means contained in said hood for directing air into said inlet duct from said suction passage when said motor is in operation whether said vehicle is moving or stationary.

References Cited in the file of this patent
UNITED STATES PATENTS

| Number | Name | Date |
| --- | --- | --- |
| 1,617,939 | Burt | Feb. 15, 1927 |
| 1,758,573 | Lucke | May 13, 1930 |
| 1,787,561 | Askam | Jan. 6, 1931 |
| 2,087,171 | Szostek | July 13, 1937 |